United States Patent [19]

Goodrich et al.

[11] Patent Number: 5,306,750

[45] Date of Patent: Apr. 26, 1994

[54] POLYMER AND ASPHALT REACTION PROCESS AND POLYMER-LINKED-ASPHALT PRODUCT

[75] Inventors: J. L. Goodrich, Lafayette, Calif.; R. J. Statz, Kennett Square, Pa.

[73] Assignees: Chevron Research and Technology Company A Divison of Chevron U.S.A. Inc., San Francisco, Calif.; E. I. Du Pont de Nemours & Co., Wilmington, Del.

[21] Appl. No.: 724,552

[22] Filed: Jun. 28, 1991

Related U.S. Application Data

[63] Continuation-in-part of Ser. No. 632,261, Dec. 21, 1990, abandoned, which is a continuation-in-part of Ser. No. 459,151, Dec. 29, 1989, abandoned.

[51] Int. Cl.$^5$ ............... C08L 95/00; C08L 63/00
[52] U.S. Cl. ............................ 524/59; 524/60; 525/54.5
[58] Field of Search ............... 525/54.5; 524/59, 60

[56] References Cited

U.S. PATENT DOCUMENTS

| | | | |
|---|---|---|---|
| 3,284,390 | 11/1966 | Scheibli | 525/54.5 |
| 3,324,041 | 6/1967 | Sommer et al. | 252/3115 |
| 4,070,532 | 1/1978 | Hammer | 525/451 |
| 4,139,511 | 2/1979 | Hayashi | 523/450 |
| 4,157,428 | 6/1979 | Hammer | 525/117 |
| 4,301,051 | 11/1981 | MarZocchi | 524/461 |
| 4,404,316 | 9/1983 | MarZocchi | 524/526 |
| 4,409,362 | 10/1983 | Bzdula et al. | 524/67 |
| 4,451,598 | 5/1984 | Decroix | 524/69 |
| 4,499,215 | 2/1985 | Okada | 523/450 |
| 4,650,820 | 3/1987 | Decroix | 524/69 |
| 4,839,404 | 6/1989 | Chang et al. | 524/69 |
| 5,019,168 | 5/1991 | Schilling | 524/59 |

FOREIGN PATENT DOCUMENTS

| | | | |
|---|---|---|---|
| 88307743 | 9/1988 | Australia . | |
| 020930 | 2/1976 | Japan . | |
| 028326 | 3/1979 | Japan | C08L 33/08 |
| 028328 | 3/1979 | Japan | C08F2 2/38 |
| 095947 | 8/1981 | Japan | C08K 5/10 |
| 147456 | 9/1983 | Japan | C08L 95/00 |
| 146302 | 6/1987 | Japan | E01C 7/30 |
| 2022597 | 12/1979 | United Kingdom . | |

OTHER PUBLICATIONS

Trade Brochure, "Ethylene Copolymers", by Orkem, no apparent publication date on document. Brochure received by Applicant in 1989 prior to applicants' filing date. p. 3 of brochure refers to date launched in 1989.

*Primary Examiner*—John C. Bleutge
*Assistant Examiner*—D. R. Wilson
*Attorney, Agent, or Firm*—W. K. Turner; J. J. DeYoung

[57] ABSTRACT

Disclosed is a thermoplastic polymer-linked-asphalt and a process for making a thermoplastic polymer-linked-asphalt. More particularly, disclosed is a reaction process for linking epoxide-containing polymers to asphalt. The improved thermoplastic polymer-linked-asphalt product is particularly useful in road paving and roofing applications.

37 Claims, No Drawings

POLYMER AND ASPHALT REACTION PROCESS AND POLYMER-LINKED-ASPHALT PRODUCT

CROSS REFERENCE TO RELATED APPLICATIONS

This application is a continuation-in-part of U.S. Ser. No. 632,261, now abandoned, filed Dec. 21, 1990 which in turn is a continuation-in-part of U.S. Ser. No. 459,151, now abandoned, filed Dec. 29, 1989, the entire disclosures of which are incorporated herein by reference.

BACKGROUND

1. Field of the Invention

The invention relates to the reaction of asphalt and polymers to produce an improved polymer-linked-asphalt product. More particularly, the present invention relates to the reaction and resultant linking of epoxide-containing polymers to asphalt forming a polyepoxy polymer-linked-asphalt composition having unique properties. The improved polymer-linked-asphalt product is particularly useful in road paving and roofing applications.

2. Publications

The use of polymers as additives to asphalt (bitumen) is well-known in the art. See for example U.S. Pat. Nos. 4,650,820 and 4,451,598 wherein terpolymers derived from ethylene, an alkyl acrylate and maleic anhydride are mixed with bitumen.

Also disclosed in a trade brochure by ORKEM is the use of terpolymers prepared from ethylene, an alkyl acrylate and either maleic anhydride or glycidyl methacrylate as enhancement additives for bitumen and tar.

U.S. Pat. No. 3,324,041 describes a polyepoxide-containing asphalt emulsion in which a polyamide/bituminous emulsion is mixed with a polyepoxide/nonionic-surfactant emulsion to form a composition which is subsequently solidified by the interaction of the polyamide and the polyepoxide. Separately, the two emulsions are stable for a long time. But, when they are mixed the final emulsion has a pot life of approximately 16 hours at 21° C. It is necessary to store each of the emulsions independently and only mix them a short time before use. Epoxidized polymers and copolymers derived from diolefins are disclosed.

Australian Patent Application 88307743 teaches a storage stable and creep resistant asphalt paving binder prepared from an asphalt having about 7 weight percent or less asphaltenes, and a copolymer derived from ethylene and at least one compound selected from the group of vinyl acetate, alkyl acrylate or methylacrylate. The patent teaches that the particular conditions at which the asphalt is blended with the polymer are not critical. Unfortunately, few asphalts have less than 7% asphaltenes, and so this modified asphalt composition is of limited use.

U.S. Pat. No. 4,839,404 discloses ethylene acrylic acid copolymers and the salts thereof as useful in paving and other types of asphalt. This patent discloses that improved adhesion of aggregate and bitumen can be achieved by incorporating small amounts of certain a-olefin/carboxylic acid copolymers into the mixture. The preferred composition is further characterized as one being substantially free of a-olefin/ester copolymers.

British Patent Application 2,022.597 discloses grafting unsaturated reactants, such as esters of unsaturated acids, including glycidyl acrylate and methacrylate onto ethylene copolymers. These graft copolymers are taught to have many uses including uses in various adhesive compositions, such as: sealing mastics, coating compositions, tackifying resins, waxes, plasticizers, bitumen, asphalts, tars, diluting polymers, fillers, stabilizing agents, etc.

U.S. Pat. No. 4,301,051, issued Nov. 17, 1981 to A. Marzocchi, et. al., discloses a chemically-modified asphalt prepared by first reacting an asphalt with (1) a polymerizable vinyl aromatic monomer and (2) a rubbery polymer, and then reacting the product with a cross linking agent. The cross linking agents disclosed include organic polyisocyanates, polyepoxide monomers having molecular weights in the range of 140 (RD4) to 420 (Araldite 508) and organic polycarboxylic acids or anhydrides. Similarly in Marzocchi et al's U.S. Pat. No. 4,404,316 a chemically-modified asphalt is prepared using a rubbery polymer containing reclaimed rubber wherein in Example 4 an epoxy having a molecular weight of 420 is utilized as a cross linking agent.

U.S. Pat. No. 4,499,215, issued Feb. 12, 1985 to S. Okada, discloses an asphalt/epoxy resin coating composition comprising cured epoxy resin and a modified asphalt. The modified asphalt is obtained by condensing asphalt with a non-thermoreactive phenol resin in the presence of an arylsulfonic acid catalyst. The epoxy resin is mixed with the modified asphalt and then the epoxy resin is reacted with conventional epoxy curing agents to form a cured epoxy resin (Column 3, line 17 and Column 3, line 41).

U.S. Pat. No. 4,409,362 to Bzdula et al. relates to the reaction of oil shale or organics separated therefrom with a low molecular weight epoxy resin such as diglycidal ether of bisphenol A using curing agents or catalysts. Room temperatures are utilized for the reaction but elevated temperatures are also suggested to expedite curing.

Even though polymer-modified asphalts are known, there still exists a need in the asphalt industry for improved asphalts. In part, this is because currently known polymer-modified asphalts have a number of deficiencies. These deficiencies include susceptibility to flexural fatigue, permanent deformation (rutting), moisture damage (stripping), and low temperature thermally-induced cracking.

Another problem with prior polymer-modified asphalts is poor storage stability and poor homogeneity of the polymer with the asphalt. Poor storage stability is evidenced by viscosity increase in storage and product gelation while poor homogeneity is evidenced by phase separation. Also, new performance criteria are continually being developed by various highway governmental agencies to increase the effective life of paved roads under diverse climatic conditions, necessitating the development of improved asphalt products.

One object of the present invention is to provide improved asphalt-containing products having enhanced performance properties particularly at low polymer concentrations.

Another object of the present invention is to provide improved asphalt-containing products having enhanced performance properties which are substantially insensitive to the crude source of the asphalt.

Other objects will be readily apparent to those skilled in the art from a reading of this specification.

SUMMARY OF THE INVENTION

According to the present invention thermoplastic polyepoxy polymer-linked-asphalt compositions having unique and surprising properties are produced through the reaction of asphalt and epoxide-containing polymers.

DETAILED DESCRIPTION OF THE INVENTION

It has been discovered that certain polymers may be reacted and linked with asphalt. The resulting reaction product is a novel polymer-linked-asphalt having unique and surprising properties. The term "polymer-linked-asphalt" as used herein refers to a polymer and asphalt composition in which the polymer is substantially covalently-bound to asphalt by one or more covalent bonds. The product polymer-linked-asphalt of the present invention provides a number of important performance characteristics, including:

improved resistance to permanent deformation (rutting);
improved resistance to flexural fatigue;
improved resistance to low temperature thermally-induced cracking; and
improved resistance to moisture damage (stripping).

The reactant asphalt and polymer, the reaction conditions, and the resulting polymer-linked-asphalt product are described below.

The Reactant Asphalt

All types of asphalts (bitumens) are useful in this invention whether they be natural or synthetic. Representative asphalts include: native rock, lake asphalts, petroleum asphalts, airblown asphalts, cracked or residual asphalts. Asphalts can be used containing a wide range of asphaltenes including asphalts containing more than 7 weight percent asphaltenes and typically more than 10 weight percent asphaltenes. Generally, the asphalts useful in this invention will contain less than 5 weight percent oxygen compounds and frequently less than 1 weight percent oxygen compounds. Also, the asphalts useful in this invention will be soluble in organic solvents commonly used to dissolve asphalt.

Preferred asphalts have a viscosity at 60° C. of 100 to 20,000 poise, preferably 200 to 10,000, more preferably 300 to 4000 and still more preferably 400 to 1500 poise.

The Reactant Polymer Composition

Reactant polymers useful in the present invention contain an epoxide moiety (oxirane) which reacts with the asphalt. The epoxide moiety may be represented by the following formula:

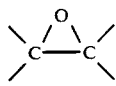

Generally the reactant epoxide-containing polymers useful in this invention will have a melt flow index as determined by ASTM D1238-65T, Condition E, in the range of from 0.1 to 2000 (molecular weight 1,000,000 to 10,000), preferably 0.5 to 500 (molecular weight 650,000 to 25,000) and more preferably 1 to 100 (molecular weight 400,000 to 40,000). Generally, the reactant polymer will contain 0.01 or more weight percent epoxide moieties and preferably more than 0.04 weight percent epoxide moieties based on the total weight of the reactant polymer. More preferably the reactant polymer will contain 0.05 to 10 weight percent epoxide moieties and still more preferably 0.1 to 5 weight percent epoxide moieties based on the total weight of the reactant polymer.

Reactant polymers may be copolymers derived from two or more monomers (such as tetrapolymers), preferably three monomers (terpolymers) and most preferably two monomers.

Other reactant epoxy-containing polymers include: epoxidized acrylate rubbers (for example, copolymers ethyl & butyl acrylate functionalized with glycidyl methacrylate), epoxidized neoprene, epoxidized polyisoprene, epoxidized oils (for example, soya oil), epoxidized stryene-butadiene rubbers, epoxidized butadiene resins, epoxidized terpolymers (e.g., EPDM), epoxidized polynorbornene, and epoxidized butadiene-acrylonitrile rubbers.

Preferred Reactant Polymer Compositions

One preferred group of epoxide-containing reactant polymers for use in the present invention are glycidyl-containing polymers. Glycidyl-containing ethylene copolymers and modified copolymers useful in the present invention are well known in the polymer art and can readily be produced by the concurrent reaction of monomers in accordance with U.S. Pat. No. 4,070,532, and PCT Application 85,223,367, the entire disclosures of which are incorporated herein by reference. Generally useful glycidyl-containing reactant polymers will contain 0.02 or more weight percent glycidyl moieties and more preferably 0.08 weight percent or more weight percent glycidyl moieties based on the total weight of the reactant polymer. The glycidyl moiety may be represented by the following formula:

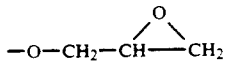

More preferably the reactant polymer will contain 0.1 to 20 weight percent glycidyl moieties and still more preferably 0.2 to 10 weight percent glycidyl moieties based on the total weight of the reactant polymer.

Particularly preferred reactant copolymers useful in this invention may be represented by the formula: E/X-/Y/Z, where E is the copolymer unit —(CH$_2$CH$_2$)— derived from ethylene; X is the copolymer unit —(CH$_2$CR$_1$R$_2$)—, where R$_1$ is hydrogen, methyl, or ethyl, and R$_2$ is carboalkoxy, acyloxy, or alkoxy of 1-10 carbon atoms (X for example is derived from alkyl acrylates, alkyl methacrylates, vinyl esters, and alkyl vinyl ethers); and Y is the copolymer unit —(CH$_2$CR$_3$R$_4$)—, where R$_3$ is hydrogen or methyl and R$_4$ is carboglycidoxy or glycidoxy (Y for example is derived from glycidyl acrylate, glycidyl methacrylate, or glycidyl vinyl ether). Additional comonomers, Z, include carbon monoxide, sulfur dioxide, acrylonitrile, or other monomers.

For this preferred embodiment of the invention, useful weight ratios of the E/X/Y/Z copolymer units are X is 0 to 50%, Y is 0.5 to 15%, Z is 0 to 15%, E being the remainder.

Still more preferred reactant copolymers are E/X/Y, where the weight percent of X varies from 0% to 40%; and the percent of Y varies from 1% to 10%; E being the remainder.

Especially preferred copolymers are E/Y, where the weight percent of Y varies from 1% to 10%, and E is the remainder.

It is also preferred that the epoxide-containing monomers, and more preferably the glycidyl-containing monomers, are incorporated into the reactant polymer by the concurrent reaction of monomers and are not grafted onto the reactant polymer by graft polymerization.

The Reaction Conditions

The asphalt and reactant polymer are combined under conditions suitable to cause reaction and linking of the reactant polymer to the asphalt. Suitable conditions will vary greatly depending upon the particular asphalt and reactant polymer chosen and the desired properties of the product polymer-linked-asphalt. Conditions under which the reaction occurs, i.e., time, temperature, type and quantity of each reactant can be determined empirically.

Surprisingly, it has been found that mixing of the reactant polymer and the asphalt alone does not produce sufficient reaction to dramatically improve the functional properties of the resultant asphalt mixture. An elevated temperature and sufficient time are required for the reaction of the reactant polymer and asphalt to occur. This is in contrast to many prior art polymer-modified asphalts wherein some polymer is blended with asphalt as an additive without the polymer ever substantially reacting with the asphalt. In the present invention the polymer-linked-asphalt product is formed by the covalent reaction of the reactant epoxide-containing polymer with asphalt.

Generally a reaction temperature of greater than 100° C. and preferably greater than 135° C. is required along with a reaction time of greater than 1 hour and preferably greater than 5 hours. Typically the reaction temperature will be in the range 125 to 250° C. with a reaction time in the range 2 to 300 hours. Preferably the reaction temperature will be in the range 150 to 230° C. with a reaction time in the range 3 to 48 hours. Still more preferably the reaction temperature will be in the range 180 to 220° C. with a reaction time in the range 4 to 24 hours.

Generally the reaction will take place at atmospheric pressure. Higher or lower pressures can of course be used but are generally less economical. Also the reactants will generally be continuously mixed during the reaction.

The reactant polymer and the asphalt reactant are combined such that the reactant polymer comprises 0.05 to 20 weight percent of the reaction mixture. Preferably the reactant polymer comprises 1 to 10 weight percent, more preferably 1 to 5 weight percent and most preferably 1 to 3 weight percent of the reaction mixture.

It has surprisingly been found that both the quantity of reactant polymer and the epoxide content of the reactant polymer, within the limits described above, are critical to achieve desirable polymer-linked-asphalt rheology and to avoid gelation of the polymer-linked-asphalt. It has been found that it is preferable to select the reactants and reaction conditions so that substantially all of the epoxide moieties are reacted within the polymer-linked-asphalt product.

Another surprising feature of the present invention is that the reaction of the epoxide-containing polymer and the asphalt can occur within an oil-in-water emulsion. In other words, the desired polymer-linked-asphalt product can develop as the reaction goes to completion within the emulsified particles. Generally, a reaction accelerating catalyst will be utilized to accelerate the reaction at normal emulsion storage temperatures in the range of 20° C. to 100° C.

One advantage of emulsifying an epoxide-containing polymer/asphalt blend is that emulsification is more readily accomplished in the unreacted state. It is easier to emulsify the lower viscosity unreacted epoxide-containing polymer/asphalt blend than it is to emulsify the higher-viscosity reacted polymer-linked-asphalt. A second advantage is that by permitting the polymer/asphalt reaction to occur within the emulsified asphalt particle, it is possible to use higher levels of epoxy-containing polymer than is practical in normal paving asphalts. This is because the viscosity of oil-in-water emulsions is not dependent on the oil-phase (e.g., polymer-linked-asphalt phase) viscosity.

Asphalt emulsions are well known in the paving art. Emulsions of this embodiment of the current invention comprise water, asphalt, epoxide-containing polymer, and surfactants. Generally, the asphalt and epoxide-containing polymer will be blended just prior to their emulsification and before any significant reaction has occurred. The reaction of the epoxide-containing polymer and asphalt will occur within the oil phase of the emulsion.

A typical emulsion will comprise:
(a) 35 to 80 wt. % asphalt (preferably 60 to 75 wt. %);
(b) 0.05 to 20 wt. % epoxide-containing polymer (preferably 0.5 to 5 wt. %);
(c) 0.05 to 5.0 wt. % surfactant (preferably 0.5 to 2.0 wt. %); and
(d) water to make 100%.

Alternatively, and more preferably, emulsions are made after the reaction of the polymer and asphalt by emulsifying the polyepoxy polymer-linked-asphalt with water and surfactants.

A typical emulsion will comprise:
(a) 35 to 85 wt. % polyepoxy polymer-linked-asphalt, preferably 60 to 75 wt. %, and more preferably 65 to 70 wt.%;
(b) 0.05 to 5.0 wt. % surfactant, preferably 0.1 to 4.0 wt. %, and more preferably 0.2 to 2.0 wt. %; and
(d) water to make 100%.

The surfactant utilized in the above described emulsions can be any of the well-known ionic and non-ionic emulsifying agents used in the paving art. See, for example, U.S. Pat. No. 4,822,427, the entire disclosure of which is incorporated herein by reference. Salts of fatty acids, or amines are well-known ionic emulsifiers. Particularly well-known emulsifers are salts of diamines and tall oil. Preferably catalysts will be included in the emulsion formulation to accelerate the polymer-linked asphalt reaction at normal emulsion storage temperatures. Other additives which can be utilized in the emulsions are well known in the art, such as, petroleum solvents and the like (0.5 to 15 wt %), and emulsion viscosity modifiers.

It has been surprisingly found that the emulsions of the present invention made after the reaction of the polymer and asphalt are stable and have a fine particle size distribution. Preferably the emulsions will have a mean particle size of less than 30 microns, preferably less than 20 microns and more preferably less than 10 microns.

The Polymer-Linked-Asphalt Reaction Product

The product of the reaction of the present invention is a novel thermoplastic polyepoxy polymer-linked-asphalt. The term "polyepoxy polymer-linked-asphalt" refers to a polymer and asphalt composition in which the polymer is substantially covalently-bound to asphalt by one or more covalent bonds formed by reaction of asphalt with one or more epoxide moieties in the reactant polymer. By the term "thermoplastic" it is meant that the polymer-linked-asphalt product softens when exposed to heat and returns to substantially its original condition when cooled.

The exact mechanism of the linking of the reactant polymer and asphalt in effecting the improved polymer-linked-asphalt product is unknown, but it is not necessary to know the mechanism in order to understand the present invention. However, without being bound by the theory, it is believed that the epoxide moiety reacts with nucleophilic sites in the asphalt (e.g., carboxylic acid, pyrollic or phenolic functional groups) to covalently bond (link) the polymer and the asphalt. Whereas simple mixing of polymers into asphalt can introduce an elastic structure through the molecular entanglement of the polymer molecules within the asphalt, reacting the polymer onto the existing molecules in the asphalt, as taught in this invention, results in a more effective use of the polymer and a substantial improvement in the asphalt's viscoelastic properties.

The formation of the product polyepoxy polymer-linked-asphalt of the present invention can be measured by an increase in reactant asphalt viscosity, but more preferably dynamic mechanical analysis (DMA) is used to measure the product properties.

The viscous and elastic properties of an asphalt are important performance indicators. Dynamic mechanical analysis properties are determined using a dynamic mechanical analyzer (DMA), for example, Rheometrics RDA-600. This instrument resolves the viscous and elastic nature of asphalt samples tested at various temperatures and shear rates.

Using the DMA, sinusoidal strains are imposed as an oscillatory shear to samples in a parallel-plate viscometer configuration. The amplitude of the stress is measured by determining the torque transmitted through the sample in response to the imposed strain. The strain amplitude and frequency are input variables, set by the operator.

Depending on the relative viscous and elastic nature of the sample at the particular test conditions, the sinusoidal stress response to the imposed sinusoidal shear strain may be out of phase. If the asphalt behaves as a purely viscous liquid (no elasticity) the peak stress response will lag 90° behind the imposed sinusoidal shear strain. With increasing elastic response, resulting for instance from the polymer linking to the asphalt, the peak stress response becomes increasing in-phase with the shear strain.

The DMA determines the peak stress and peak strain. The ratio of the peak stress to the peak strain is the absolute value of the modulus, or the complex shear modulus, $|G^*|$.

$$|G^*| = \text{peak stress/peak strain} \qquad \text{Eq. 1}$$

The in-phase component of $|G^*|$, the dynamic shear storage modulus, or $G'$, equals the stress in phase with the shear strain divided by the strain, or:

$$G' = |G^*| \cos(\Delta) \qquad \text{Eq. 2}$$

$\Delta$ is the phase shift angle between the applied maximum shear strain and the maximum shear stress.

The out-of-phase component of $|G^*|$, the dynamic shear loss modulus, or $G''$, equals the stress 90° out of phase with the shear strain divided by the strain, or $$G'' = |G^*| \sin(\Delta) \qquad \text{Eq. 3}$$

Typical units for $|G^*|$, $G'$ and $G''$ are Pascals (SI) or dynes/cm$^2$ (cgs).

An important performance-related property of an asphalt is the ratio of $G''$ to $G'$. This is called the loss tangent.

$$\text{Loss Tangent} = \tan(\Delta) = G''/G' \qquad \text{Eq. 4}$$

A detailed discussion of DMA is published in "Asphalt and Polymer Modified Asphalt Properties Related to the Performance of Asphalt Concrete Mixes," *Proc. of the Association of Asphalt Paving Technologists*, Vol. 58, (1988) by J. L. Goodrich.

The increase in the elastic nature of an asphalt due to effective polymer-linking is indicated by sustained desirable rheology (low loss tangents) at temperatures up through 80° C. using DMA.

A second indicator of an effective polymer-linked-asphalt product of the present invention is a substantially storage stable viscosity. By "storage stable viscosity" it is meant that after completion of the reaction time there is no evidence of gelation and the viscosity of the product does not increase by a factor of 4 or more during storage at 163° C. for 10 days. Preferably the viscosity does not increase by a factor of 2 or more during storage at 163° C. for 10 days. More preferably the viscosity increases less than 25% during 10 days of storage at 163° C.

A substantial increase in viscosity while the asphalt is stored is not desirable due to the resulting difficulties in handling the product and meeting and maintaining product specifications at the time of sale and use.

A third indicator of an effective polymer-linked-asphalt product of the present invention, in addition to a low loss tangent and storage stable viscosity, is homogeneity. Homogeneity of the polymer-linked-asphalt product is evidenced by there being no observation of phase separation or the formation of a surface "skin" in samples stored at 177° C. (350° F.) for typically 72–96 hours after completion of the reaction time.

The product polymer-linked-asphalt of the present invention will typically exhibit the following loss tangent, storage stability and homogeneity properties:

TABLE I

|  | Loss Tangent | | Polymer Content (wt. % in Polymer-Linked-Asphalt) | Storage Stability Homogeneity |
| --- | --- | --- | --- | --- |
|  | @ 60° C. | @ 80° C. |  |  |
| Broadly | <50 | <100 | 0.05–20 | Smooth, no separation, not gelled. |
| Preferred | 0.01–20 | 0.01–50 | 1–10 | Smooth, no separation, not gelled. |
| More Preferred | 0.01–10 | 0.01–20 | 1–5 | Smooth, no separation, not gelled. |

TABLE I-continued

|  | Loss Tangent @ 60° C. | Loss Tangent @ 80° C. | Polymer Content (wt. % in Polymer-Linked-Asphalt) | Storage Stability Homogeneity |
|---|---|---|---|---|
| Most Preferred | 0.01–5 | 0.01–10 | 1–3 | Smooth, no separation, not gelled. |

Uses of the Polymer-Linked-Asphalt Reaction Product

The thermoplastic polymer-linked-asphalt reaction product of the present invention (polyepoxy polymer-linked-asphalt) are useful in various types of asphalt applications including paving, industrial and roofing applications. The reaction product may be used neat or in emulsified form. Asphalt emulsions are well known in the paving art and comprise water, asphalt (including the polymer-linked-asphalt of the present invention) and surfactants.

An especially preferred use is in road paving in which hot polymer-linked-asphalt is mixed with hot mineral aggregate to make asphalt concrete mixes. The polymer-linked-asphalts of the present invention are particularly effective in hot mix paving compositions at low levels of reactant polymer generally in the range of 1 to 10 weight percent, preferably in the range 1 to 5 weight percent and more preferably in the range 1 to 3 weight percent of the reaction mixture.

Other Additives and Modifications

Reaction controlling agents, such as catalysts and quenching agents, can be used to accelerate, decelerate or terminate the reaction of the epoxide moiety in the reaction mixture.

Many catalysts can be used for accelerating the epoxide-containing polymer/asphalt reaction rate. Representative catalysts are disclosed in: "Handbook of Epoxy Resins", H. Lee and K. Neville, McGraw-Hill Book Company, Inc., New York 1967 and "Epoxy Resins", H. Lee and K. Neville, McGraw-Hill Book Company, Inc., New York 1957, the disclosures of which are incorporated herein by reference.

Suitable catalysts for accelerating the reaction of the epoxide-containing reactant polymer with asphalt, particularly in promoting the reaction at low temperatures (for example, in the range of 20 to 100° C.) include organometallic compounds and tertiary amine compounds. Examples of organometallic catalysts include: lead octanoate, lead naphthenate, tetra-sec-butyl titanate, hydrocarbon mono-, or di-, or polycarboxylic acid metallic salts which provide a source of catalytic cations (e.g., $Al^{+++}$, $Cd^{++}$, $Ca^{++}$, $Cu^{++}$, $Fe^{++}$, $In^{+++}$, $Mn^{++}$, $Sb^{+++}$, $Sn^{++}$, and $Zn^{++}$), e.g.: stannous octoate, zinc stearate, dibutyltindilaurate. Examples of tertiary amine compounds include: a-methylbenzyl dimethylamine, trimethylamine, triethylamine, benzyldimethylamine, dimethylaminomethyl phenol (DMP-10), triethanolamine, tri(hydroxymethyl)aminomethane, m-diethylaminophenol, benzyldimethylamine (BDMA), tris(dimethylaminomethyl)phenol (DMP-30), poly(ethylene/dimethylamino ethylmethacrylate), s-triazine, triallylcyanurate, benzyltrimethylammonium hydroxide, tri-2-ethylhexoate salt of tris(dimethylaminomethyl)phenol.

Other accelerators include: triphenyl phosphite, ethylene sulfite, and organophosphines (e.g., tricyclohexylphosphine).

Polymers not containing an epoxide functionality may be added to the asphalt in addition to the epoxide-containing reactant polymer used in this invention. These added polymers may include, but are not limited to, polymers having the composition E/X/Z, where E is derived from ethylene, X is derived from alkyl acrylates, alkyl methacrylates, vinyl esters, or alkyl vinyl ethers. Optionally, Z may be part of the copolymer, wherein Z is derived from carbon monoxide, sulfur dioxide, or acrylonitrile. These copolymers, which do not have asphalt reactive functionality, may have weight ratios of the E/X/Z components in the range X is 5% to 50%, Z is 0 to 15%, E being the remainder. Preferred ratios are X is 15% to 40%, Z is 0 to 10%, and E being the remainder. These non-reactive diluent polymers can be combined into the asphalt, with the epoxide-containing copolymers reactant of this invention, so they comprise 0% to 18% of the final polymer-linked-asphalt composition, preferably 0 to 15%, more preferably 0 to 10%.

The preferred E/X/Y/Z reactant copolymer used in the present invention can be used either as the principal reactant with an asphalt, or with an additional co-reactant polymer. In this case the preferred reactant copolymer is used to link another copolymer indirectly to asphalt. For example, E/X/Y/Z can be allowed to react with an asphalt for one hour, followed by the addition of a coreactant polymer E/X/N/Z. In another example, useful products can be manufactured in which an epoxy-containing polymer and a coreactant polymers react with each other after a minor amount of epoxide-containing polymer/asphalt reaction has occurred. Such products may be particularly useful in roofing compositions. These coreactant polymers preferably have nucleophilic functionality that can react with the epoxy or glycidyl moiety of E/X/Y/Z. Such nucleophilic functional groups include acids, alcohols, amines and thiols. A preferred coreactant polymer, E/X/N/Z, includes compositions where N is derived from an alkylacrylic acid, acrylic acid, alkyl anhydride, or mono-alkyl maleate. The use of the E/X/N/Z as a coreactant can improve the effectiveness of the E/X-/Y/Z asphalt blend.

Preferred weight ratios of the E/X/N/Z copolymer useful as a coreactant with E/X/Y/Z copolymers are X is 0 to 50%, N is 0.5 to 25%, Z is 0 to 15%, E being the remainder.

The advantages of the present invention will be readily apparent from consideration of the following examples. It is understood that these examples are provided for the sake of illustration and comparison only and not as a limitation on the scope of the invention.

EXAMPLES

Data from the samples and tests described below appear in Tables II–VI.

Preparation of Samples

To 400 grams of asphalt heated to 204° C. (400° F.) was added various polymers. The mixture was blended under nitrogen using a propeller-type stirrer for two hours while maintaining the temperature at 204° C. The blended mixture was stored in a 204° C. oven for two additional hours and then transferred to a 163°–177° C. (325°–350° F.) oven for storage for up to 4 days.

Measurement of the Dynamic Viscoelastic Properties

The dynamic viscoelastic properties of asphalts, polymer asphalt blends and polymer-linked-asphalts were measured using DMA on aged residues from Rolling Thin Film Oven (RTFO), ASTM D 2872.

Parallel plates of different diameters were used to obtain the data at different temperatures:

| Sample Type | Plate Diameter | Test Temperature |
| --- | --- | --- |
| RTFO residue | 8 mm | $-30°$ C. to $+10°$ C. |
| RTFO residue | 25 mm | $-10°$ C. to $+50°$ C. |
| RTFO residue | 40 mm | $+50°$ C. to $+100°$ C. |

Sample specimen thickness between the parallel plates was 1 to 2.5 mm.

Strains were kept small ($<0.5\%$) at low temperatures and increased at higher temperatures, but were kept within the linear viscoelastic region as indicated by strain sweeps. Frequencies from 0.1 radians/sec (0.0159 Hz) to 10 radians/sec (1.59 Hz) were swept for each test temperature in five equal steps per frequency decade.

The loss tangent ($G''/G'$) values at 20° C., 40° C., 60° C., and 80° C. for a variety of samples are shown in Tables II-VI.

Resistance of Asphalt Concrete to Permanent Deformation at 40° C.

Creep studies were conducted at 40° C. using 10.2 cm by 20.3 cm (4 in. by 8 in.) cylindrical specimens of asphalt concrete (95% Mineral Aggregate, 5% Binder). Axial loading of the samples, 172 KPa (25 psi), was done in a triaxial cell. The asphalt concrete samples were tested with no confining pressure. The creep deformation was measured axially in the middle 10.2 cm (4 in.) portion of the test cylinder. The deformation was recorded during the 60-minute loading period and during a 30-minute recovery period.

The deformation over time is expressed as the slope of the creep modulus versus time in Table IV. The more deformation (an undesirable condition), the more negative the slope. The loss tangent ($G''/G'$), at 20° C., 40° C., 60° C., and 80° C., for each asphalt, polymer-modified asphalt and polymer-linked asphalt used in the creep studies is also shown in Table IV.

The data in Table IV demonstrates that the polymer-linked-asphalts of the present invention, Run Nos. 303 and 304, provide excellent resistance to creep deformation in asphalt concrete mixes. Asphalt "A" in Run No. 300 is an asphalt which is prone to deformation or rutting at high temperatures. Asphalt "B" in Run No. 301 is an example of one of the more rutting resistant conventional asphalts. The polymer-linked-asphalts (using an asphalt similar to Asphalt "A") in Run Nos. 303 and 304 have far superior resistance to deformation than either of the "conventional" asphalts or blended polymer-modified asphalt (Run No. 302) as measured by the slope of the creep modulus versus time.

Beam Fatigue Lief of Asphalt Concrete at 25° C.

Beam fatigue equipment was used to measure flexural fatigue life was operated in a controlled stress mode and employed a four-point loading design as described in "Asphalt and Polymer Modified Asphalt Properties Related to the Performance of Asphalt Concrete Mixes, *Proc. of the Association of Asphalt Paving Technologists*, Vol. 58, (1988) by J. L. Goodrich; Santucci, L. E. and Schmidt, R. J., "The Effect of Asphalt Properties on the Fatigue Resistance of Asphalt Paving Mixtures," *Proc. of the Association of Asphalt Paving Technologists*, Vol. 38, pp. 65-97 (1969); and Yao, Z. and Monismith, C. L. "Behavior of Asphalt Mixtures with Carbon Black Reinforcement," *Proc. of the Association of Asphalt Paving Technologists*, Vol. 55, pp. 564-585 (1986).

The loading cycle consisted of 0.05 second pulse load followed by a 0.55-second rest period (100 cycles per minute).

The bending load was adjusted to yield prescribed initial strains. The strains reported are those set after a preconditioning period of 200 load applications. The fatigue life data are shown in Table V. The loss tangent ($G''/G'$), at 20° C., 40° C., 60° C., and 80° C., for each asphalt, polymer-modified asphalt, and polymer-linked-asphalt used in the flexural fatigue life experiments is also shown in Table V.

The data in Table V demonstrates that asphalt concrete made using the polymer-linked-asphalt of the present invention, Run Nos. 403 and 404, have superior resistance to fatigue cracking at low initial strains compared to Run Nos. 400, 401, and 402 as measured by cycles-to-fail at 25° C. This is particularly surprising, considering the low polymer level of the mixes in Run Nos. 403 and 404.

Good resistance to fatigue cracking is shown by the data in Table V to be correlated to binders which have low loss tangents at the test temperature. The magnitude of the separate dynamic binder moduli $G'$ (the elastic component) and $G''$ (the viscous component) are not as important to fatigue life as is the $G''/G'$ ratio. The loss tangent ($G''/G'$) is also more correlated to the fatigue life than is the magnitude of the complex viscosity.

Asphalt-Aggregate Adhesion in Wet and Dry Conditions

The durability of the asphalt-aggregate bond under moist conditions was measured using the "split tensile strength" method, ASTM D-4867. In this method, cylindrical asphalt concrete specimens, produced by using asphalt, polymer-modified, or polymer-linked-asphalt and a dense-graded mineral aggregate, were loaded diametrically until the specimen split apart. The peak load applied to the specimen was recorded as a measure of the mix strength. The strength of the asphalt concrete cylinders was measured both as dry specimens and after vacuum saturating the specimens in water at 60° C. The data for asphalt concrete specimens produced from asphalts, polymer-modified asphalt or polymer-linked-asphalt are shown in Table VI along with the percent of split tensile strength retained after the moisture treatment for each specimen.

The data demonstrates that the mixes in Run Nos. 505, 506 and 507 which used the polymer-linked-asphalts of the present invention retained their dry strength better after water soaking than did the control asphalts of Run Nos. 500 and 501. This may indicate that the resistance of the modified asphalt's cohesive strength to water is improved, or it may also indicate that the additional chemical functionality/polarity provided by the polyepoxy polymer-linked-asphalt improves that wet strength of the asphalt-aggregate bond. In either case, the data demonstrates that the mix benefits from the polymer-linked-asphalt of the present invention.

TABLE II
EFFECT OF EPOXIDE REACTANTS ON POLYMER-LINKED-ASPHALTS

| | POLYMER DESCRIPTION | | | | | | POLYMER-ASPHALT BLEND FORMULA | | |
|---|---|---|---|---|---|---|---|---|---|
| Run No. | Ethylene Wt. % | Co-Monomer | Wt. % | GMA Wt. % | Melt Index | Melt Point, C. | Asphalt* Wt. % | Polymer Wt. % | GMA % |
| 100 | — | — | — | — | — | — | 100.00 | 0.00 | 0 |
| 101 | 64.4 | VA | 29.1 | 6.5 | 17.5 | — | 97.92 | 2.08 | 0.135 |
| 102 | 52.9 | VA | 41.5 | 5.6 | 79.8 | — | 97.59 | 2.41 | 0.135 |
| 103 | 63.6 | nBA | 28.0 | 8.4 | 11.0 | 64.3 | 98.39 | 1.61 | 0.135 |
| 104 | 60.2 | nBA | 34.5 | 5.3 | 6.0 | 63.3 | 97.45 | 2.55 | 0.135 |
| 105 | 66.7 | nBA | 28.0 | 5.3 | 12.0 | 69.7 | 97.45 | 2.55 | 0.135 |
| 106 | 72.6 | nBA | 26.0 | 1.4 | 15.0 | 74.6 | 90.36 | 9.64 | 0.135 |
| 107 | 72.6 | nBA | 26.0 | 1.4 | 15.0 | 74.6 | 97.45 | 2.55 | 0.035 |
| 108 | 66.9 | nBA | 33.1 | 0.0 | 33.3 | — | 97.45 | 2.55 | 0 |
| 109 | 75.4 | nBA | 24.6 | 0.0 | 8.3 | — | 97.45 | 2.55 | 0 |
| 110 | 98.2 | — | 0.0 | 1.8 | 5.0 | 106.1 | 92.50 | 7.50 | 0.135 |
| 111 | 98.2 | — | 0.0 | 1.8 | 5.0 | 106.1 | 97.45 | 2.55 | 0.045 |
| 112 | 69.2 | MA | 25.9 | 4.9 | 9.2 | — | 97.24 | 2.76 | 0.135 |
| 113 | 70.1 | MA | 25.1 | 4.8 | 17.8 | — | 97.19 | 2.81 | 0.135 |
| 114 | 74.2 | IBA | 20.1 | 5.7 | 4.2 | — | 97.63 | 2.37 | 0.135 |
| 115 | 64.8 | IBA | 30.0 | 5.2 | 117.0 | — | 97.40 | 2.60 | 0.135 |
| 116 | 70.1 | IBA | 24.8 | 5.1 | 15.1 | — | 97.35 | 2.65 | 0.135 |
| 117 | 77.6 | EA | 17.0 | 5.4 | 9.6 | — | 97.50 | 2.50 | 0.135 |
| 118 | 67.7 | EA | 27.2 | 5.1 | 16.3 | — | 97.35 | 2.65 | 0.135 |
| 119 | Note 1. | VA | 12.0 | 0.45 | 1.4 | — | 97.45 | 2.55 | 0.011 |
| 120 | Note 1. | VA | 12.0 | 0.85 | 5.7 | — | 97.45 | 2.55 | 0.021 |

| | OBSERVATIONS ON THE BLENDED POLYMER-ASPHALT | | | DYNAMIC RHEOLOGICAL ANALYSIS Loss Tangent (Tan Delta) | | | |
|---|---|---|---|---|---|---|---|
| Run No. | Sample appearance after 1 day @ 177 C. | Homogeneity after 1 day | Sample appearance after 4 days @ 177 C. | 20 C. | 40 C. | 60 C. | 80 C. |
| 100 | Smooth | — | Smooth | 4.3 | 20.8 | 180 | 722 |
| 101 | Smooth | No separation | Smooth | 2.6 | 3.2 | 5.4 | 16 |
| 102 | Smooth | No separation | Smooth | 2.8 | 3.2 | 7.2 | 30 |
| 103 | Smooth | No separation | Smooth | 2.6 | 3.7 | 5.8 | 18 |
| 104 | Grainy | Skinning and separation | Skinning and gelled | — | — | — | — |
| 105 | Smooth | No separation | Smooth | 2.2 | 2.8 | 4.7 | 9.7 |
| 106 | Gelled | — | — | — | — | — | — |
| 107 | Smooth | No separation | Smooth | 2.1 | 4.0 | 10.4 | 50 |
| 108 | Smooth | No separation | Smooth | 1.9 | 5.0 | — | — |
| 109 | Smooth | No separation | Smooth, skin on surface | 2.1 | 4.0 | 8.4 | 35 |
| 110 | Gelled | — | — | — | — | — | — |
| 111 | Smooth | No separation | Smooth, sl. viscous | 2.6 | 3.2 | 3.7 | 5.8 |
| 112 | Smooth, sl. viscous | No separation | Smooth, sl. viscous | 2.6 | 3.0 | 3.7 | 7.2 |
| 113 | Smooth, sl. viscous | No separation | Smooth, sl. viscous | 2.6 | 2.8 | 4.3 | 6.2 |
| 114 | Smooth | No separation | Smooth | 2.4 | 2.4 | 2.2 | 5.8 |
| 115 | Smooth | No separation | Smooth | 2.3 | 3.5 | 9.0 | 30 |
| 116 | Smooth | No separation | Smooth, skin on surface | 2.1 | 2.6 | 3.7 | 6.2 |
| 117 | Smooth | No separation | Smooth, skin on surface | 2.2 | 2.8 | 3.5 | 7.2 |
| 118 | Smooth | No separation | Smooth, skin on surface | 2.3 | 2.8 | 3.6 | 7.2 |
| 119 | Separate phases | Total separation | — | — | — | — | — |
| 120 | Separate phases | Total separation | — | — | — | — | — |

*Asphalt = 1500 Poise at 60 C.
Note 1. These polymers were produced according to UK Patent No. 2022597; that is, by attempting to graft the GMA monomer onto an E/VA copolymer.
E = ethylene
MA = methyl acrylate
EA = ethyl acrylate
IBA = isobutyl acrylate
nBA = normal butyl acrylate
VA = vinyl acetate
GMA = glycidyl methacrylate

TABLE III
POLYMER-LINKED-ASPHALTS
Effect of Polymer Type, Asphalt Source, and Epoxide Content

| | POLYMER DESCRIPTION | | | | | POLYMER-ASPHALT BLEND FORMULA | | |
|---|---|---|---|---|---|---|---|---|
| Run No. | Asphalt ID | Ethylene, Wt. % | Co-Monomer | Wt. % | GMA, Wt. % | Melt Index | Polymer Wt. % | Asphalt Wt. % | GMA % in blend |
| 200 | ASPHALT A | 75.4 | nBA | 24.6 | 0.0 | 8.3 | 5 | 95 | 0.00 |
| 201 | (1500 Poise | 66.9 | nBA | 33.1 | 0.0 | 33.3 | 5 | 95 | 0.00 |
| 202 | at 60 C.) | 68.6 | nBA | 30.0 | 1.4 | ~10 | 5 | 95 | 0.07 |
| 203 | | 61.0 | nBA | 34.0 | 5.0 | ~10 | 5 | 95 | 0.25 |
| 204 | | 61.0 | nBA | 34.0 | 5.0 | ~10 | 4 | 96 | 0.20 |
| 205 | | 61.0 | nBA | 34.0 | 5.0 | ~10 | 3 | 97 | 0.15 |
| 206 | | 64.0 | nBA | 27.6 | 8.4 | 10.6 | 5 | 95 | 0.42 |
| 207 | | 64.0 | nBA | 27.6 | 8.4 | 10.6 | 4 | 96 | 0.34 |

TABLE III-continued

POLYMER-LINKED-ASPHALTS
Effect of Polymer Type, Asphalt Source, and Epoxide Content

| Run No. | Asphalt ID | | | | | | | | |
|---|---|---|---|---|---|---|---|---|---|
| 208 | | 64.0 | nBA | 27.6 | 8.4 | 10.6 | 3 | 97 | 0.25 |
| 209 | | 64.0 | nBA | 27.6 | 8.4 | 10.6 | 2 | 98 | 0.17 |
| 210 | | 62.1 | nBA | 33.9 | 4.0 | — | 5 | 95 | 0.20 |
| 211 | | 63.3 | nBA | 33.7 | 3.0 | — | 5 | 95 | 0.15 |
| 212 | | 64.4 | nBA | 33.6 | 2.0 | — | 5 | 95 | 0.10 |
| 213 | | 65.1 | nBA | 33.5 | 1.4 | — | 5 | 95 | 0.07 |
| 214 | | 70.0 | nBA | 26.0 | 4.0 | — | 5 | 95 | 0.20 |
| 215 | | 71.3 | nBA | 25.7 | 3.0 | — | 5 | 95 | 0.15 |
| 216 | | 72.7 | nBA | 25.3 | 2.0 | — | 5 | 95 | 0.10 |
| 217 | | 73.5 | nBA | 25.1 | 1.4 | — | 5 | 95 | 0.07 |
| 218 | ASPHALT B | — | — | — | — | — | 0 | 100 | 0 |
| 219 | (2000 Poise | 62.2 | nBA | 33.8 | 4.0 | — | 5 | 95 | 0.20 |
| 220 | at 60 C.) | 63.4 | nBA | 33.6 | 3.0 | — | 5 | 95 | 0.15 |
| 221 | | 64.5 | nBA | 33.5 | 2.0 | — | 5 | 95 | 0.10 |
| 222 | | 65.2 | nBA | 33.4 | 1.4 | — | 5 | 95 | 0.07 |
| 223 | | 68.6 | nBA | 30.0 | 1.4 | — | 4 | 96 | 0.06 |
| 224 | | 68.6 | nBA | 30.0 | 1.4 | — | 2 | 98 | 0.03 |
| 225 | | 72.0 | nBA | 27.3 | 0.7 | — | 4 | 96 | 0.03 |
| 226 | | 73.7 | nBA | 26.0 | 0.4 | — | 4 | 96 | 0.01 |
| 227 | | 75.4 | nBA | 24.6 | 0.0 | — | 4 | 96 | 0.00 |
| 228 | ASPHALT C | 61.0 | nBA | 34.0 | 5.0 | — | 3.6 | 96.4 | 0.18 |
| 229 | (450 Poise at | 62.5 | nBA | 33.8 | 3.8 | — | 3.6 | 96.4 | 0.14 |
| 230 | 60 C.) | 64.6 | nBA | 33.5 | 1.9 | — | 3.6 | 96.4 | 0.07 |
| 231 | | 66.9 | nBA | 33.1 | 0.0 | — | 3.6 | 96.4 | 0.00 |
| 232 | ASPHALT D | 61.0 | nBA | 34.0 | 5.0 | — | 4 | 96 | 0.20 |
| 233 | (2000 Poise | 62.5 | nBA | 33.8 | 3.8 | — | 4 | 96 | 0.15 |
| 234 | at 60 C.) | 63.9 | nBA | 33.6 | 2.5 | — | 4 | 96 | 0.10 |
| 235 | | 68.4 | nBA | 30.4 | 1.2 | — | 4 | 96 | 0.05 |

| | | POLYMER-ASPHALT BLEND PROPERTIES | | DYNAMIC RHEOLOGICAL ANALYSIS | | | |
|---|---|---|---|---|---|---|---|
| | | Gelled after | | Loss Tangent (Tan Delta) | | | |
| Run No. | Asphalt ID | 17 to 24 hrs at 177 C. | Appearance of Blend | 20 C. | 40 C. | 60 C. | 80 C. |
| 200 | ASPHALT A | No | Smooth | | | | |
| 201 | (1500 Poise | No | Smooth | 2.4 | 4 | 15 | >100 |
| 202 | at 60 C.) | No | Smooth | | | | |
| 203 | | Yes | Smooth | | | | |
| 204 | | Yes | Smooth | | | | |
| 205 | | No | Smooth | 3.2 | 3.3 | 5.8 | 18.5 |
| 206 | | Yes | Smooth | | | | |
| 207 | | Yes | Smooth | | | | |
| 208 | | Yes | Smooth | | | | |
| 209 | | No | Smooth | 3.2 | 3.5 | 4.6 | 11.7 |
| 210 | | Yes | Smooth | | | | |
| 211 | | "On edge" | Smooth | | | | |
| 212 | | No | Smooth | | | | |
| 213 | | No | Smooth | | | | |
| 214 | | Yes | Smooth | | | | |
| 215 | | "On edge" | Smooth | | | | |
| 216 | | No | Smooth | | | | |
| 217 | | No | Smooth | | | | |
| 218 | ASPHALT B | No | Smooth | 2.1 | 3.4 | 21.9 | 108.0 |
| 219 | (2000 Poise | Yes | Smooth | | | | |
| 220 | at 60 C.) | Yes | Smooth | | | | |
| 221 | | Yes | Smooth | | | | |
| 222 | | Yes | Smooth | | | | |
| 223 | | No | Smooth | 1.1 | 1.4 | 2.8 | 6.2 |
| 224 | | No | Smooth | 1.0 | 1.9 | 5.6 | 20.0 |
| 225 | | No | Smooth | 0.9 | 1.2 | 1.9 | 8.9 |
| 226 | | No | Smooth | 1.2 | 1.8 | 2.9 | 8.0 |
| 227 | | No | Smooth | 1.2 | 1.9 | 3.2 | 9.3 |
| 228 | ASPHALT C | Yes | Smooth | | | | |
| 229 | (450 Poise at | No | Smooth | 1.9 | 1.8 | 3.0 | 7.4 |
| 230 | 60 C.) | No | Smooth | | | | |
| 231 | | No | Smooth | | | | |
| 232 | ASPHALT D | Yes | Smooth | | | | |
| 233 | (2000 Poise | No | Smooth | 1.8 | 1.7 | 2.5 | 4.9 |
| 234 | at 60 C.) | No | Smooth | | | | |
| 235 | | No | Smooth | 1.2 | 1.5 | 6.6 | 34.1 | nBA = normal butyl acrylate
GMA = glycidyl methacrylate

TABLE IV

RESISTANCE OF ASPHALT CONCRETE TO PERMANENT DEFORMATION AT 40 C.

| Run No. | POLYMER DESCRIPTION | | | | POLYMER-ASPHALT BLEND FORMULA | | | ASPHALT CONCRETE RESISTANCE to DEFORMATION @ 40 C. Slope, (log MODULUS/ log TIME) | DYNAMIC RHEOLOGICAL ANALYSIS of BINDER Loss Tangent (Tan Delta) | | | |
|---|---|---|---|---|---|---|---|---|---|---|---|---|
| | Ethylene Wt. % | Co-Monomer | Wt. % | GMA Wt. % | Polymer Wt. % | Asphalt* Wt. % | GMA % in blend | | 25 C. | 40 C. | 60 C. | 80 C. |
| 300 | — | — | — | — | 0 | 100(A) | 0.00 | −0.110 | 7.7 | 32.7 | 187 | 1400 |
| 301 | — | — | — | — | 0 | 100(B) | 0.00 | −0.067 | 2.5 | 4 | 23 | 130 |
| 302 | 60.0 | VA | 40.0 | 0.0 | 5 | 95(C) | 0.00 | −0.076 | 3.3 | 7.1 | 38 | 220 |
| 303 | 64.0 | nBA | 27.6 | 8.4 | 2 | 98(C) | 0.17 | −0.034 | 3.5 | 3.5 | 4.6 | 11.7 |
| 304 | 61.0 | nBA | 34.0 | 5.0 | 3 | 97(C) | 0.15 | −0.051 | 3.5 | 3.3 | 5.8 | 18.5 |

VA = vinyl acetate
nBA = normal butyl acrylate
GMA = glycidyl methacrylate
*Asphalt A = 2180 Poise at 60 C.
Asphalt B = 1450 Poise at 60 C.
Asphalt C = 1500 Poise at 60 C.

TABLE V

BEAM FATIGUE LIFE OF ASPHALT CONCRETE at 25 C.

| Run No. | POLYMER DESCRIPTION | | | | | POLYMER-ASPHALT BLEND FORMULA | | |
|---|---|---|---|---|---|---|---|---|
| | Ethylene Wt. % | Co-Monomer | Wt. % | GMA Wt. % | Melt Index | Polymer Wt. % | Asphalt* Wt. % | GMA % in blend |
| 400 | — | — | — | — | — | 0 | 100(A) | 0 |
| 401 | — | — | — | — | — | 0 | 100(B) | 0 |
| 402 | 60.0 | VA | 40.0 | 0.0 | 48–66 | 5 | 95(C) | 0 |
| 403 | 64.0 | nBA | 27.6 | 8.4 | 10.6 | 2 | 98(C) | 0.17 |
| 404 | 61.0 | nBA | 34.0 | 5.0 | ~10 | 3 | 97(C) | 0.15 |

| Run No. | ASPHALT CONCRETE BEAM FATIGUE LIFE Cycles-to-Fail at 25 C. Initial Beam Microstrain | | | | DYNAMIC RHEOLOGICAL ANALYSIS Loss Tangent (Tan Delta) | | | |
|---|---|---|---|---|---|---|---|---|
| | 1000 | 700 | 400 | 200 | 25 C. | 40 C. | 60 C. | 80 C. |
| 400 | NA | 1000 | 20000 | 100000 | 7.7 | 32.7 | 187 | 1400 |
| 401 | 20000 | 50000 | 200000 | 2000000 | 2.5 | 4 | 23 | 130 |
| 402 | NA | 1000 | 20000 | 100000 | 3.3 | 7.1 | 38 | 220 |
| 403 | 3000 | 30000 | 1000000 | >10000000* | 3.5 | 3.5 | 4.6 | 11.7 |
| 404 | 10000 | 60000 | 1000000 | >10000000* | 3.5 | 3.3 | 5.8 | 18.5 |

*estimated
VA = vinyl acetate
nBA = normal butyl acrylate
GMA = glycidyl methacrylate
*Asphalt A = 2180 Poise at 60 C.
Asphalt B = 1450 Poise at 60 C.
Asphalt C = 1500 Poise at 60 C.

TABLE VI

ASPHALT-AGGREGATE ADHESION in WET and DRY CONDITIONS

| Run No. | POLYMER DESCRIPTION | | | | | POLYMER-ASPHALT BLEND FORMULA | | | ASPHALT-AGGREGATE ADHESION Split Tensile Strength** of Asphalt Concrete, psi | | |
|---|---|---|---|---|---|---|---|---|---|---|---|
| | Ethylene, Wt. % | Co-Monomer | Wt. % | GMA, Wt. % | Melt Index | Polymer Wt. % | Asphalt* Wt. % | GMA % in blend | Wet | Dry | % Retained |
| 500 | — | — | — | — | — | 0 | 100 | 0.00 | 122.0 | 237.3 | 51.4 |
| 501 | — | — | — | — | — | 0 | 100 | 0.00 | 96.9 | 169.5 | 57.2 |
| 502 | 73.8 | nBA | 26.2 | 0.0 | 1.7 | 5 | 95 | 0.00 | 139.5 | 220.4 | 63.3 |
| 503 | 75.4 | nBA | 24.6 | 0.0 | 8.3 | 5 | 95 | 0.00 | 135.8 | 209.2 | 64.9 |
| 504 | 66.9 | nBA | 33.1 | 0.0 | 33.3 | 5 | 95 | 0.00 | 125.5 | 179.7 | 69.8 |
| 505 | 61.0 | nBA | 34.0 | 5.0 | ~10 | 4 | 96 | 0.20 | 152.5 | 221.2 | 68.9 |
| 506 | 61.0 | nBA | 34.0 | 5.0 | ~10 | 3 | 97 | 0.15 | 156.3 | 218.3 | 71.6 |
| 507 | 68.6 | nBA | 30.0 | 1.4 | ~10 | 5 | 95 | 0.07 | 150.7 | 205.8 | 73.2 | nBA = normal butyl acrylate
GMA = glycidyl methacrylate
*Asphalt = 1500 Poise at 60 C.
**ASTM D-4867 (Effect of Moisture on Asphalt-Concrete Paving Mixtures)

What is claimed is:

1. A polyepoxy polymer-linked-asphalt thermoplastic composition having a loss tangent of less than 50 at 60° C. and less than 100 at 80° C. wherein the polymer content of said polymer-linked-asphalt composition is from 0.05 to 20 weight percent of said composition and wherein the polymer in said polymer-linked-asphalt is derived from a reactant glycidyl-containing ethylene copolymer having a melt flow index in the range 0.1 to 2,000 as determined by ASTM D1238-65T, Condition E, wherein said polymer is substantially covalently-bound to the asphalt by one or more covalent bonds, wherein the asphalt in said polymer-linked-asphalt is selected from the group consisting of native rock asphalts, lake asphalts, petroleum asphalts, airblown asphalts, cracked and residual asphalts and, wherein substantially all of the epoxide moieties are reacted within the polymer-linked-asphalt product.

2. The composition of claim 1 wherein said polymer-linked-asphalt composition has a storage-stable viscosity such that the viscosity of said composition does not increase by a factor of 4 or more during storage at 163° C. for ten days and is homogeneous where said homogeneity is evidenced by no phase separation or the formation of surface skin in samples stored at 177° C. for 72-96 hours after completion of the reaction.

3. The composition of claim 1 wherein said polymer-linked-asphalt composition has a loss tangent of 0.01 to 20 at 60° C. and 0.01 to 50 at 80° C. and the polymer content of said polymer-linked-asphalt is from 1 to 10 weight percent of said composition.

4. The composition of claim 3 wherein said polymer-linked-asphalt composition has a storage-stable viscosity such that the viscosity of said composition does not increase by a factor of 4 or more during storage at 163° C. for ten days and is homogeneous where said homogeneity is evidenced by no phase separation or the formation of surface skin in samples stored at 177° C. for 72-96 hours after completion of the reaction.

5. The composition of claim 1 wherein said polymer-linked-asphalt composition has a loss tangent of 0.01 to 10 at 60° C. and 0.01 to 20 at 80° C. and the polymer content of said polymer-linked-asphalt is from 1 to 5 weight percent of said composition.

6. The composition of claim 5 wherein said polymer-linked-asphalt composition has a storage-stable viscosity such that the viscosity of said composition does not increase by a factor of 4 or more during storage at 163° C. for ten days and is homogeneous where said homogeneity is evidenced by no phase separation or the formation of surface skin in samples stored at 177° C. for 72-96 hours after completion of the reaction.

7. The composition of claim 1 wherein said polymer-linked-asphalt composition has a loss tangent of 0.01 to 5 at 60° C. and 0.01 to 10 at 80° C. and the polymer content of said polymer-linked-asphalt is from 1 to 3 weight percent of said composition.

8. The composition of claim 4 wherein said polymer-linked-asphalt composition has a storage-stable viscosity such that the viscosity of said composition does not increase by a factor of 4 or more during storage at 163° C. for ten days and is homogeneous where said homogeneity is evidenced by no phase separation or the formation of surface skin in samples stored at 177° C. for 72-96 hours after completion of the reaction.

9. A road paving emulsion comprising water and the composition of claim 7.

10. A road paving emulsion comprising water and the composition of claim 8.

11. An asphalt concrete comprising mineral aggregate and the composition of claim 7.

12. A composition comprising a polyepoxy polymer-linked-asphalt thermoplastic composition wherein the polymer content of said polymer-linked-asphalt composition is from 0.05 to 20 weight percent of said composition and wherein the polymer in said polymer-linked asphalt is derived from a glycidyl-containing ethylene copolymer having a melt flow index in the range 0.1 to 2,000 as determined by ASTM D1238-65T, Condition E, wherein said polymer is substantially covalently-bound to the asphalt by one or more covalent bonds and wherein said composition has a storage-stable viscosity such that the viscosity of said composition does not increase by a factor of 4 or more during storage at 163° C. for ten days and is homogeneous where said homogeneity is evidenced by no phase separation or the formation of surface skin in samples stored at 177° C. for 72-96 hours after completion of the reaction, wherein the asphalt in said polymer-linked-asphalt is selected from the group consisting of native rock asphalts, lake asphalts, petroleum asphalts, airblown asphalts, cracked and residual asphalts and, wherein substantially all of the epoxide moieties are reacted within the polymer-linked-asphalt product.

13. The composition of claim 12 wherein said composition increases in viscosity less than 25% during storage at 163° C. for 10 days.

14. A composition comprising a polyepoxy polymer-linked-asphalt thermoplastic composition reaction product prepared by mixing and reacting an asphalt with an epoxide-containing reactant polymer under reaction conditions sufficient to form said thermoplastic polyepoxy polymer-linked-asphalt wherein the polymer content of said polymer-linked-asphalt composition is from 0.05 to 20 weight percent of said composition and wherein the polymer in said polymer-linked-asphalt is derived from a glycidyl-containing ethylene copolymer having a melt flow index in the range 0.1 to 2,000 as determined by ASTM D1238-65T, Condition E, wherein said polymer is substantially covalently-bound to the asphalt by one or more covalent bonds, wherein said the asphalt in said polymer-linked-asphalt is selected from the group consisting of native rock asphalts, lake asphalt, petroleum, asphalts, airblown asphalts, cracked and residual asphalts and, wherein substantially all of the epoxide moieties are reacted within the polymer-linked-asphalt product.

15. The composition of claim 14 wherein said reaction conditions include a reaction mixture comprising 80 to 99.5 weight percent of an asphalt having a viscosity in the range of 100 to 20,000 poise at 60° C. and 0.5 to 20 weight percent of a an epoxide-containing reactant polymer wherein the reactant polymer comprises a glycidyl-containing reactant copolymer wherein the glycidyl moieties,

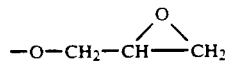

in said copolymer ranges from 0.1 to 20 weight percent based on the total weight of the reactant polymer.

16. The composition of claim 15 wherein the reactant copolymer is a terpolymer made from the concurrent reaction of ethylene, an alkyl acrylate and a glycidyl ester selected from the group consisting of glycidyl acrylate and glycidyl methacrylate.

17. The composition of claim 15 wherein the reactant polymer is a terpolymer made from the concurrent reaction of ethylene, normal butyl acrylate, and glycidyl ester selected from the group consisting of glycidyl acrylate and glycidyl methacrylate.

18. The composition of claim 15 wherein the reactant copolymer is a terpolymer made from the concurrent reaction of ethylene, vinyl acetate, and a glycidyl ester selected from the group consisting of glycidyl acrylate and glycidyl methacrylate.

19. The composition of claim 15 wherein said reactant polymer is a copolymer made from the concurrent reaction of ethylene and a glycidyl ester selected from the group consisting of glycidyl acrylate and glycidyl methacrylate.

20. The composition of claim 19 wherein the glycidyl moieties in said copolymer ranges from 0.2 to 10 weight percent based on the total weight of the reactant polymer.

21. The composition of claim 20 wherein said reaction conditions include a reaction temperature greater than 100° C. and a reaction time greater than 1 hour.

22. The composition of claim 21 wherein said reaction conditions include a reaction temperature in the range of 125° to 250° C. and a reaction time in the range of 3 to 48 hours.

23. The composition of claim 22 wherein said polymer-linked-asphalt has a loss tangent of 0.01 to 20 at 60° C. and 0.01 to 50 at 80° C. and the polymer content of said polymer-linked-asphalt is from 1 to 10 weight percent of said composition.

24. The composition of claim 22 wherein said polymer-linked-asphalt composition has a loss tangent of 0.01 to 10 at 60° C. and 0.01 to 20 at 80° C. and the polymer content of said polymer-linked-asphalt is from 1 to 5 weight percent of said composition.

25. The composition of claim 22 wherein said polymer-linked-asphalt composition has a loss tangent of 0.01 to 5 at 60° C. and 0.01 to 10 at 80° C. and the polymer content of said polymer-linked-asphalt is from 1 to 3 weight percent of said composition.

26. The composition of claim 25 wherein said reaction conditions include a reaction temperature in the range 180° to 220° C. and a reaction time from 4 to 24 hours.

27. A composition comprising a polyepoxy polymer-linked-asphalt thermoplastic composition reaction product prepared by mixing under reaction conditions sufficient to form said thermoplastic polyepoxy polymer-linked-asphalt:
(A) 80-99.5 weight percent of an asphalt having a viscosity in the range of 100 to 20,000 poise at 60° C. wherein the asphalt in said polymer-linked-asphalt is selected from the group consisting of native rock asphalts, lake asphalts, petroleum asphalts, airblown asphalts, cracked or residual asphalts, and
(B) 0.5-20 weight percent of an ethylene copolymer of the formula

E/X/Y/Z where E is the copolymer unit:

—(CH$_2$—CH$_2$)— and comprises 20-99.5 weight percent of the ethylene copolymer;
X is the copolymer unit:

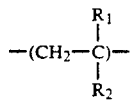

where $R_1$ is hydrogen, methyl, or ethyl, $R_2$ is carboalkoxy, acyloxy, or alkoxy of 1–10 carbon atoms, and X comprises 0–50 weight percent of the ethylene copolymer, are Y is the copolymer unit:

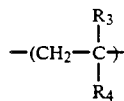

where $R_3$ is hydrogen or methyl, $R_4$ is carboglycidoxy or glycidoxy, and Y comprises 0.5–15 weight percent of the ethylene copolymer, and
Z is a copolymer unit formed from carbon monoxide, sulfur dioxide, or acrylonitrile, and Z comprises 0–15 weight percent of the ethylene copolymer; wherein said polymer is substantially covalently-bound to the asphalt by one and more covalent bonds and, wherein substantially all of the epoxide moieties are reacted within the polymer-linked-asphalt product.

28. The composition of claim 27 wherein said ethylene copolymer is E/X/Y where X is from 0 to 40 weight percent, Y is from 1 to 10 weight percent and E is the remainder.

29. The composition of claim 28 wherein said reaction conditions include a reaction temperature in the range of 125° to 250° C. and reaction time in the range of 3 to 48 hours.

30. The composition of claim 29 wherein $R_1$ is hydrogen or methyl, $R_2$ is carboalkoxy or acyloxy, $R_3$ is methyl, and $R_4$ is carboglycidoxy.

31. The composition of claim 29 wherein said ethylene copolymer is E/Y where Y is from 1 to 10 weight percent and E is the remainder.

32. The composition of claim 31 wherein $R_3$ is methyl and $R_4$ is carboglycidoxy.

33. An emulsion comprising:
(a) 35 to 80 wt. % asphalt wherein said asphalt is selected from the group consisting of native rock asphalts, lake asphalts, petroleum asphalts, airblown asphalts, cracked and residual asphalts;
(b) 0.05 to 20 wt. % epoxide-containing polymer;
(c) 0.05 to 5.0 wt. % surfactant; and
(d) water to make 100%;
wherein said epoxide-containing polymer is derived from a glycidyl-containing ethylene copolymer having a melt flow index in the range 0.1 to 2,000 as determined by ASTM D1238-65T, Condition E and, wherein substantially all of the epoxide moieties are reacted within the polymer-linked-asphalt product.

34. An emulsion comprising:
(a) 35 to 85 wt. % of a polyepoxy polymer-linked-asphalt composition;
(b) 0.05 to 5.0 wt. % surfactant; and
(c) water to make 100%;
and wherein the polymer in said polymer-linked asphalt is derived from a reactant glycidyl-containing ethylene copolymer having a melt flow index in the range 0.1 to 2,000 as determined by ASTM D1238-65T, Condition E, wherein said polymer is substantially covalently-bound to the asphalt by one or more covalent bonds and wherein the polymer content of said polymer-linked-asphalt is from 0.05 to 20 weight percent of said composition, wherein the asphalt in said polymer-linked-asphalt is selected from the group consisting of native rock asphalts, lake asphalts, petroleum asphalts, airblown asphalts, cracked and residual asphalts and, wherein substantially all of the epoxide moieties are reacted within the polymer-linked-asphalt product.

35. The emulsion of claim 34 wherein said polyepoxy polymer-linked-asphalt composition comprises a thermoplastic polyepoxy polymer-linked-asphalt reaction product prepared by mixing under reaction conditions sufficient to form said polyepoxy polymer-linked-asphalt:

(a) 80–99.5 weight percent of an asphalt having a viscosity in the range of 100 to 20,000 poise at 60° C., and (b) 0.5–20 weight percent of a copolymer having a melt index in the range of 0.1 to 2000 made from the concurrent reaction of ethylene and a glycidyl ester selected from the group consisting of glycidyl acrylate and glycidyl methacrylate and wherein the glycidyl moieties,

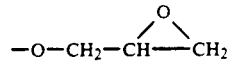

in said copolymer ranges from 0.1 to 20 weight percent based on the total weight of the reactant polymer.

36. The emulsion of claim 35 wherein said polyepoxy polymer-linked-asphalt composition comprises 60 to 75 wt. % of said emulsion and said emulsion has a mean particle size of less than 30 microns.

37. The emulsion of claim 36 wherein said polyepoxy polymer-linked-asphalt composition comprises 65 to 70 wt. % of said emulsion and said emulsion has a mean particle size of less than 10 microns.

* * * * *